United States Patent
Le et al.

[11] Patent Number: 5,853,195
[45] Date of Patent: Dec. 29, 1998

[54] FRONT RAIL ASSEMBLY FOR A VEHICLE

[75] Inventors: Jialiang Le, Troy; Lawrence B. Hewitt, Ann Arbor, both of Mich.

[73] Assignee: Ford Global Technologies, Inc., Dearborn, Mich.

[21] Appl. No.: 784,889

[22] Filed: Jan. 16, 1997

[51] Int. Cl.⁶ .................................................. B62D 21/15
[52] U.S. Cl. ........................ 280/784; 296/189; 188/377
[58] Field of Search ........................... 293/133; 296/188, 296/189; 280/784, 797; 188/377

[56] References Cited

U.S. PATENT DOCUMENTS

| | | | |
|---|---|---|---|
| 2,297,123 | 9/1942 | Almdale | 280/106 |
| 3,088,749 | 5/1963 | Schilberg | 280/106 |
| 3,188,110 | 6/1965 | Wessells, III | 280/106 |
| 4,615,558 | 10/1986 | Nakamura et al. | 296/203 |
| 4,684,151 | 8/1987 | Drewek | 280/784 |
| 5,100,189 | 3/1992 | Futamata et al. | 293/132 |
| 5,244,248 | 9/1993 | Bovelian | 296/194 |
| 5,370,438 | 12/1994 | Mori et al. | 296/203 |
| 5,429,388 | 7/1995 | Wheatley et al. | 280/784 |
| 5,560,672 | 10/1996 | Lim et al. | 296/189 |
| 5,700,049 | 12/1997 | Shibata | 296/188 |
| 5,785,367 | 7/1998 | Baumann et al. | 293/133 |

FOREIGN PATENT DOCUMENTS

| | | | |
|---|---|---|---|
| 330759 | 9/1989 | European Pat. Off. | 296/188 |
| 4020745A1 | 1/1992 | Germany . | |
| 4306824 | 9/1994 | Germany | 296/188 |
| 4287777 | 10/1992 | Japan . | |
| 597057 | 4/1993 | Japan . | |
| 5330452 | 12/1993 | Japan . | |

*Primary Examiner*—Charles T. Jordan
*Assistant Examiner*—Christopher K. Montgomery
*Attorney, Agent, or Firm*—Daniel M. Stock; Roger L. May

[57] ABSTRACT

A front rail assembly includes first and second front rails extending longitudinally with respect to the vehicle. Each rail includes a front end, and comprises inner and outer rail members having substantially C-shaped cross-sections which are welded together to form the front rails. First and second plates are secured, respectively, within the first and second rails between the respective inner and outer rail members. The plates span the length of the first and second rails for improved energy absorption characteristics as a result of the double-box section formed.

5 Claims, 2 Drawing Sheets

FRONT RAIL ASSEMBLY FOR A VEHICLE

TECHNICAL FIELD

The present invention relates to a front rail assembly for a vehicle having a body-on-frame configuration.

BACKGROUND OF THE INVENTION

Many heavy vehicles, such as utility vehicles, pickup trucks, and large luxury vehicles, comprise a body-on-frame configuration in which the vehicle body is supported directly on top of the support frame. The support frame typically comprises opposing longitudinally extending side rails secured by laterally extending cross-rails and having a bumper disposed at the front of each rail. The portions of the side rails extending between the bumper and the engine cross-rail are typically referred to as front rails. These front rails conventionally comprise inner and outer rail members having boxed substantially C-shaped cross-sections which mate to form a front rail having a substantially rectangular overall cross-section.

Such front rails are preferably configured to absorb and dissipate substantial amounts of energy in frontal impacts. In order to encourage sequential deformation of the front rails during a frontal impact, the front rails are typically provided with convolutions formed along the inner and outer rail members which are spaced along the length of the rails. These convolutions are operative to encourage sequential deformation of the front rails starting from the front end of the front rails and progressing toward the engine cross-rail.

Some vehicles require improved energy absorption characteristics for such front rails, particularly in vehicles with substantial weight. For example, electric vehicles which require large batteries will have increased weight, and therefore these vehicles will have increased energy dissipation requirements at the front rails.

Accordingly, it is desirable to improve such energy absorption characteristics in front rail assemblies without compromising the natural mode of sequential deformation encouraged by the above-referenced convolutions formed along the rail members.

DISCLOSURE OF THE INVENTION

The present invention presents an improvement over the above-referenced prior art front rail assemblies by providing a rail assembly which includes a plate extending longitudinally along the front rail and positioned along its neutral axis to form a double-box section (i.e., a cross-section forming rectangular or square adjacent portions) for improved energy absorption without compromising the natural mode of deformation during a frontal impact.

More specifically, the present invention provides a front rail assembly for a vehicle having a body-on-frame configuration. The front rail assembly comprises first and second rails extending longitudinally with respect to the vehicle. The rails each have a front end, and include inner and outer rail members having substantially C-shaped cross-sections. The inner and outer rail members are welded together to form the front rails. First and second plates are secured, respectively, within the first and second rails between the respective inner and outer rail members. The plates substantially span the entire length of the first and second rails for improved energy absorption characteristics.

Accordingly, an object of the present invention is to provide a front rail assembly for a vehicle in which energy absorption is improved without compromising the natural mode of deformation of the front rails during a frontal impact.

The above object and other objects, features, and advantages of the present invention are readily apparent from the following detailed description of the best mode for carrying out the invention when taken in connection with the accompanying drawings.

DETAILED DESCRIPTION OF THE PREFERRED EMBODIMENT

Figure 1:
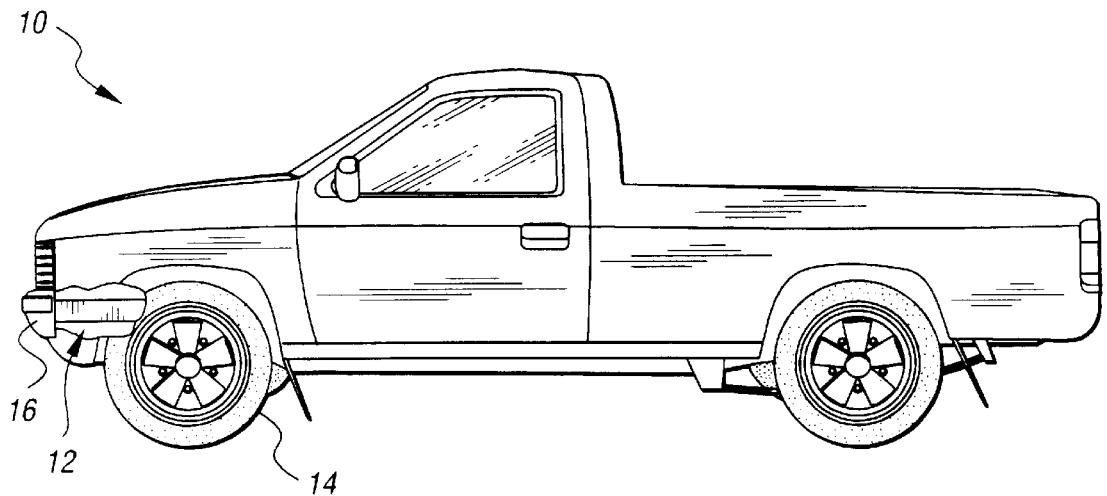
FIG. 1 shows a partially cut-away side view of a vehicle including a front rail assembly in accordance with the present invention.
Figure 2:
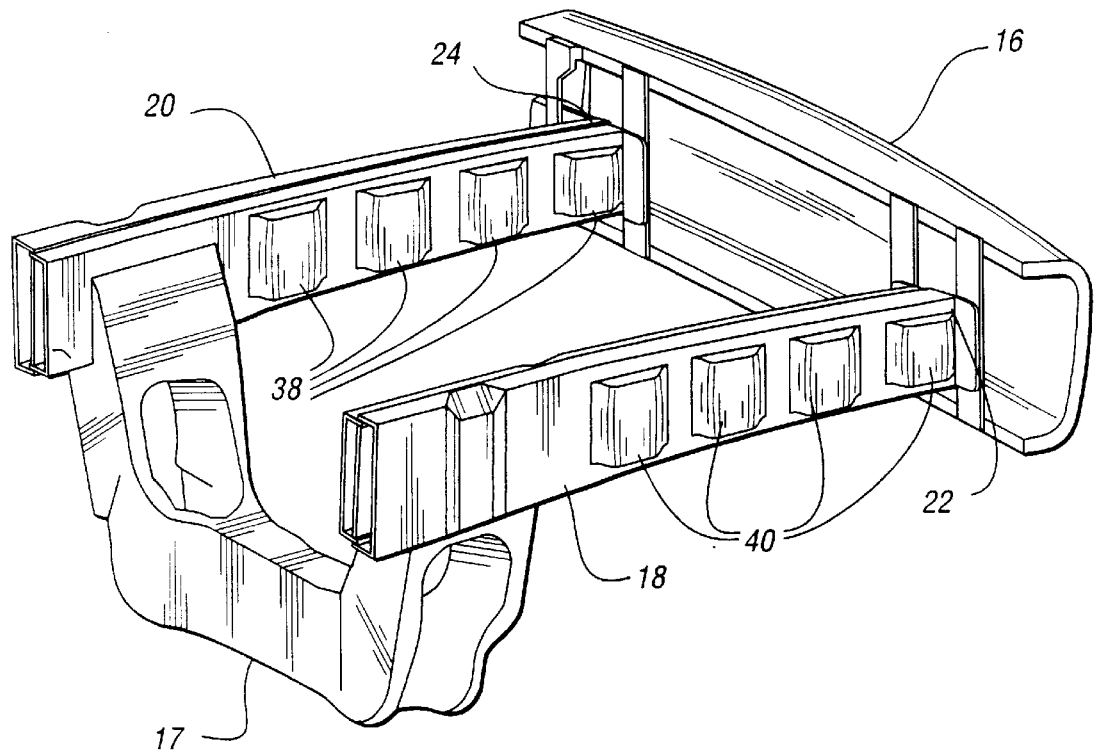
FIG. 2 shows a perspective view of a front rail assembly in accordance with the present invention.

Referring to FIG. 1, a vehicle 10 is shown which incorporates a body-on-frame configuration. The frame includes a front rail assembly 12 extending between the front wheels 14 and front bumper 16.

In a frontal impact, it is desirable to dissipate a maximum amount of energy in the front rail assembly 12. Accordingly, forward in vehicle from the engine cross-rail 17, shown in FIG. 4, maximum energy dissipation is sought.

Figure 3:
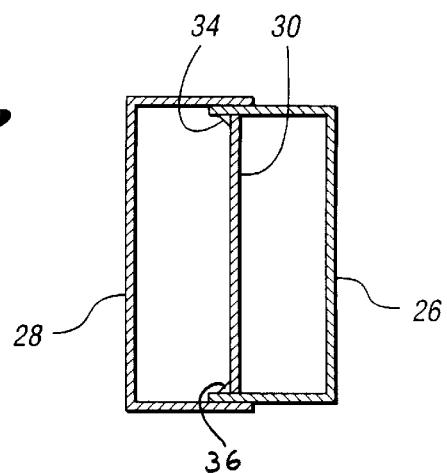
FIG. 3 shows a vertical cross-section of a front rail and support plate in accordance with the present invention.

Referring to FIGS. 2–5, the front rail assembly 12 comprises first and second front rails 18,20 extending longitudinally with respect to the vehicle. The first and second front rails 18,20 each comprise a front end 22,24, respectively, which are secured to the bumper 16. The first and second front rails 18,20 each include inner and outer rail members 26,28, as shown in FIG. 3. The inner and outer rail members 26,28 each have a substantially C-shaped cross-section, and are welded together to form the front rails 18,20.

As shown, each front rail 18,20 is provided with a vertically upstanding plate 30,32 secured, respectively, within the first and second rails 18,20 between the inner and outer rail members 26,28. Referring to FIG. 3, the plate 30 is welded to the rail 26 to form a box section, and rail 28 is then welded onto this box section to form a double-box section. The plates 30,32 extend the length of the first and second rails 18,20 for improved energy absorption characteristics, and are welded into position along the neutral axis of the rails 18,20. Referring to FIG. 3, the weld locations 34,36 are shown for attaching the plates 30,32 within the rails 18,20.

Figure 4:
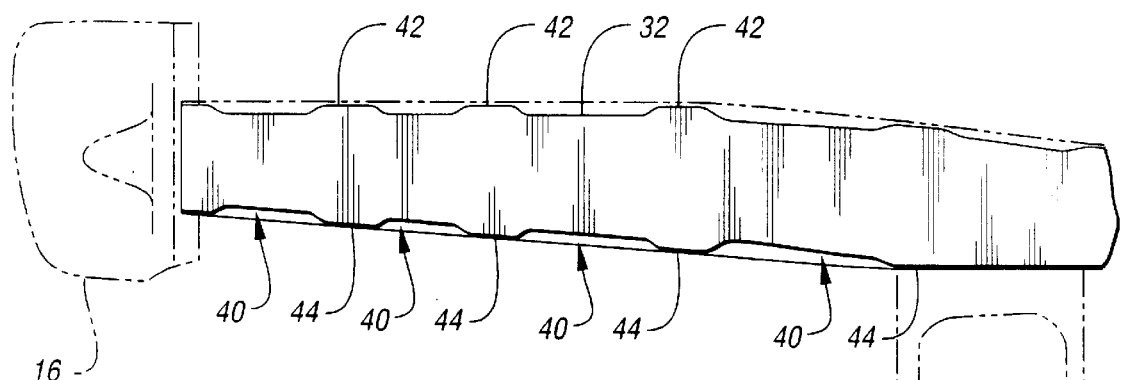
FIG. 4 shows a side view of a front rail assembly in accordance with the present invention with the bumper, front rail and engine cross-rail shown in phantom.
Figure 5:
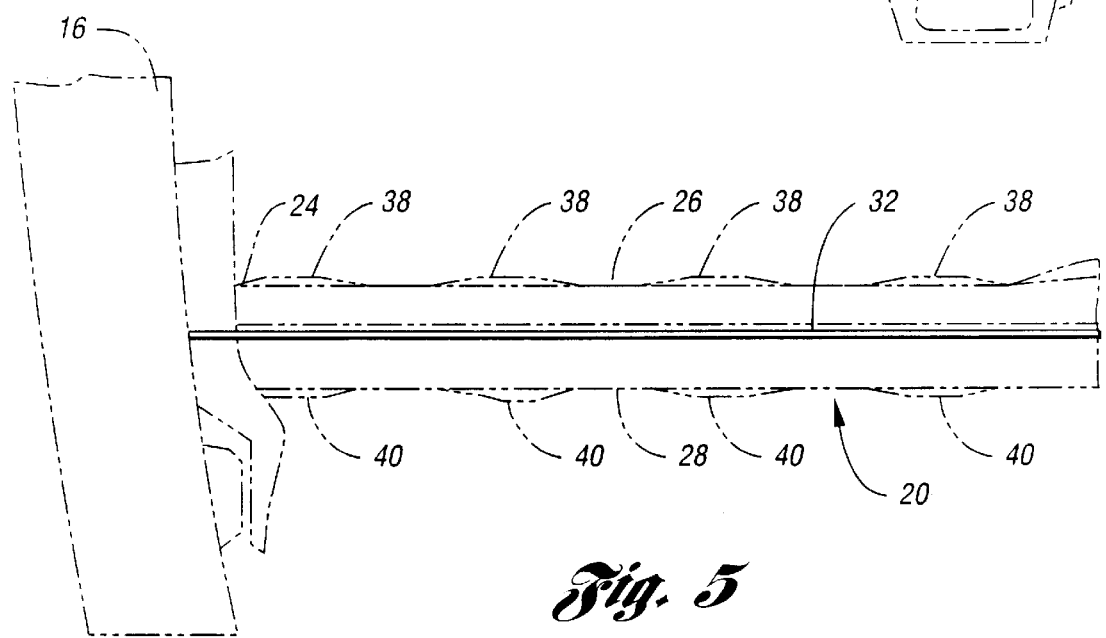
FIG. 5 shows a partial top plan view of a front rail assembly in accordance with the present invention with all components shown in phantom except for the upstanding support plate.

As shown in FIG. 5, the inner and outer rail members 26,28 each include a plurality of convolutions 38,40 formed therealong and spaced evenly along the length of the rails. These convolutions are configured to encourage sequential deformation of the rails 18,20 during a frontal impact. The plates 30,32 are secured within the front rails 18,20 in a manner not to inhibit this sequential deformation of the front rails. In order to accomplish this, as shown in FIG. 4, the plates 30,32 are welded to the rails 18,20 at a plurality of attachment locations 42,44 positioned between the convolutions 40 so that a natural mode of deformation is not interrupted.

The inner and outer rail members 26,28 and support plates 30,32 are preferably formed of a high strength steel which is 3 mm thick. In the preferred embodiment, an AOS 1058 steel is used, as manufactured by A. O. Smith Corporation. Accordingly, the support plates 30,32 have the same yield stiffness as the inner and outer rail members 26,28 so that the plates 30,32 do not interfere with the natural collapse mode of the rails.

The plates 30,32 extend rearward beyond the engine cross-rail 17. Rearward in vehicle of the engine cross-rail 17, the plates 30,32 are welded within the respective side rails for stability.

This configuration provides improved front end energy absorption as a result of the double-box section formed in the forward portion of the vehicle, which will improve the vehicle deceleration signature in a high-energy impact while reducing intrusion into the occupant compartment.

While the best mode for carrying out the invention has been described in detail, those familiar with the art to which this invention relates will recognize various alternative designs and embodiments for practicing the invention within the scope of the appended claims.

What is claimed is:

1. A front rail assembly for a vehicle having a body-on-frame configuration, the front rail assembly comprising:

first and second front rails extending longitudinally with respect to the vehicle, said rails each comprising a front end, and said rails further comprising inner and outer rail members having substantially C-shaped cross-sections which are welded together to form said front rails, each front rail having a neutral axis;

first and second plates secured, respectively, within said first and second rails between the respective inner and outer rail members along the respective neutral axis and substantially spanning the length of said first and second rails to form respective double-box cross-sections for improved energy absorption characteristics; and wherein said inner and outer rail members each comprise a plurality of convolutions formed thereon and spaced along the length thereof to encourage sequential deformation during frontal impact, and said plates are welded to the rails at a plurality of attachment locations positioned between said convolutions in a manner not to inhibit said sequential deformation.

2. A rail assembly for a vehicle, comprising:

first and second front rails extending longitudinally with respect to the vehicle, said front rails each comprising a front end, and further comprising mating inner and outer rail members having substantially C-shaped cross-sections which are welded together to form said front rails;

first and second vertically oriented plates secured, respectively, within said first and second front rails between the respective inner and outer rail members and substantially spanning the length of said first and second rails for improved energy absorption characteristics and wherein said inner and outer rail members each comprise a plurality of convolutions formed thereon and spaced along the length thereof to encourage sequential deformation during frontal impact, and said plates are welded to the rails at a plurality of attachment locations positioned between said convolutions in a manner not to inhibit said sequential deformation.

3. The rail assembly of claim 2, further comprising a bumper extending between the respective front ends of the first and second rails.

4. The rail assembly of claim 2, wherein said plates each comprise a stamped steel material.

5. The rail assembly of claim 4, wherein said plates comprise the same material as said inner and outer rail members.

* * * * *